(12) United States Patent
Owens, Jr. et al.

(10) Patent No.: US 7,912,618 B2
(45) Date of Patent: Mar. 22, 2011

(54) BACKUP RELAY CUT CONTROL SYSTEM

(75) Inventors: C. Richard Owens, Jr., Powell, OH (US); Toshihiro Okama, Tochigi (JP)

(73) Assignee: Honda Motor Co., Ltd., Tokyo (JP)

(*) Notice: Subject to any disclaimer, the term of this patent is extended or adjusted under 35 U.S.C. 154(b) by 174 days.

(21) Appl. No.: 12/017,948

(22) Filed: Jan. 22, 2008

(65) Prior Publication Data

US 2009/0184579 A1 Jul. 23, 2009

(51) Int. Cl.
*G06F 19/00* (2006.01)
(52) U.S. Cl. .................. 701/102; 701/101; 701/103
(58) Field of Classification Search .......... 307/10.7, 307/10.1, 141.4; 439/34; 701/101–105, 701/115; *G06F 19/00*
See application file for complete search history.

(56) References Cited

U.S. PATENT DOCUMENTS

| | | | |
|---|---|---|---|
| 3,820,009 A | 6/1974 | Itoh et al. | |
| 3,876,931 A | 4/1975 | Godshalk | |
| 4,137,557 A | 1/1979 | Ciarniello et al. | |
| 4,390,828 A | 6/1983 | Converse et al. | |
| 4,396,880 A | 8/1983 | Windebank | |
| 4,424,477 A | 1/1984 | Enoshima et al. | |
| 4,527,112 A | 7/1985 | Herman | |
| 4,766,862 A | 8/1988 | Hibino et al. | |
| 4,848,700 A | 7/1989 | Lockheed | |
| 4,852,540 A | 8/1989 | Safranek | |
| 4,902,956 A | 2/1990 | Sloan | |
| 4,950,168 A * | 8/1990 | Watanabe et al. | ............. 439/34 |
| 5,087,869 A | 2/1992 | Kuriyama et al. | |
| 5,142,162 A * | 8/1992 | Sundeen et al. | ........... 307/10.7 |
| 5,204,992 A | 4/1993 | Carpenter | |
| 5,214,385 A | 5/1993 | Gabriel et al. | |
| 5,235,946 A | 8/1993 | Fodale et al. | |
| 5,272,380 A | 12/1993 | Clokie | |
| 5,280,232 A | 1/1994 | Kohl et al. | |
| 5,293,076 A | 3/1994 | Fukui | |
| 5,295,078 A | 3/1994 | Stich et al. | |
| 5,298,797 A | 3/1994 | Redl | |
| 5,300,874 A | 4/1994 | Shimamoto et al. | |
| 5,332,958 A | 7/1994 | Sloan | |
| 5,343,137 A | 8/1994 | Kitaoka et al. | |

(Continued)

FOREIGN PATENT DOCUMENTS

WO  WO 96/11817  4/1996

OTHER PUBLICATIONS

PCT International Search Report, Mar. 13, 2009.

*Primary Examiner* — Michael Cuff
*Assistant Examiner* — Keith Coleman
(74) *Attorney, Agent, or Firm* — Mark E. Duell; Rankin Hill & Clark LLP

(57) ABSTRACT

A battery protection system is provided in a vehicle having an ignition system for selectively starting and stopping an engine of the vehicle and an electrical system including an electrical load and a battery that selectively delivers electric current to said load via a first device that protects said load from receiving excessive current. The battery protection system includes: a second device that selectively connects and disconnects the load from the battery; and a controller that controls said second device in response to a detected number of ignition cycles.

15 Claims, 3 Drawing Sheets

U.S. PATENT DOCUMENTS

| | | |
|---|---|---|
| 5,385,126 A | 1/1995 | Matthews |
| 5,444,378 A | 8/1995 | Rogers |
| 5,450,321 A | 9/1995 | Crane |
| 5,602,462 A | 2/1997 | Stich et al. |
| 5,621,298 A | 4/1997 | Harvey |
| 5,668,465 A | 9/1997 | May |
| 5,684,370 A | 11/1997 | Watanabe |
| 5,691,619 A | 11/1997 | Vingsbo |
| 5,693,986 A | 12/1997 | Vettraino, Jr. et al. |
| 5,699,050 A | 12/1997 | Kanazawa |
| 5,717,937 A | 2/1998 | Fritz |
| 5,764,469 A | 6/1998 | Slepian et al. |
| 5,793,359 A | 8/1998 | Ushikubo |
| 5,798,577 A | 8/1998 | Lesesky et al. |
| 5,831,411 A | 11/1998 | Klauer et al. |
| 5,872,443 A | 2/1999 | Williamson |
| 5,896,023 A | 4/1999 | Richter |
| 6,066,899 A | 5/2000 | Rund et al. |
| 6,081,098 A | 6/2000 | Bertness et al. |
| 6,313,608 B1 | 11/2001 | Varghese et al. |
| 6,316,914 B1 | 11/2001 | Bertness |
| 6,331,762 B1 | 12/2001 | Bertness |
| 6,515,456 B1 | 2/2003 | Mixon |
| 6,700,386 B2 | 3/2004 | Egami |
| 6,759,760 B2 | 7/2004 | Gaynier et al. |
| 6,806,588 B2 | 10/2004 | Amano et al. |
| 6,836,718 B2 | 12/2004 | Hasfjord et al. |
| 6,871,151 B2 | 3/2005 | Bertness |
| 7,003,411 B2 | 2/2006 | Bertness |
| 7,116,078 B2 | 10/2006 | Colombo et al. |
| 7,126,341 B2 | 10/2006 | Bertness et al. |
| 7,146,959 B2 | 12/2006 | Thompson et al. |
| 7,173,347 B2 | 2/2007 | Tani et al. |
| 7,310,025 B2 * | 12/2007 | Mitsuda ............................ 331/74 |
| 2003/0236599 A1 | 12/2003 | Saito et al. |
| 2004/0189254 A1 | 9/2004 | Kapsokavathis et al. |
| 2004/0263176 A1 | 12/2004 | Vonderhaar et al. |
| 2005/0024061 A1 | 2/2005 | Cox et al. |
| 2005/0068039 A1 | 3/2005 | Bertness |
| 2005/0162172 A1 | 7/2005 | Bertness |
| 2005/0285445 A1 | 12/2005 | Wruck et al. |
| 2006/0214508 A1 | 9/2006 | Binder |
| 2006/0282227 A1 | 12/2006 | Bertness |
| 2007/0069734 A1 | 3/2007 | Bertness |
| 2007/0159177 A1 | 7/2007 | Bertness et al. |

* cited by examiner

BACKUP RELAY CUT CONTROL SYSTEM

BACKGROUND

The present specification relates generally to the electrical arts. More specifically, the present specification relates to a battery protection system and/or method for automatically disconnecting one or more electrical loads from a battery when one or more selected conditions are detected and/or certain criteria are met. Particular application is found in connection with an electrical system of a motor vehicle (e.g., an automobile or other vehicle driven by an internal combustion engine), and the specification makes particular reference thereto. However, it is to be appreciated that aspects of the present subject matter are also amenable to other like applications.

As is known in the art, during the vehicle manufacturing process it is generally desirable to test various electrical components or systems of a vehicle. Accordingly, the vehicle battery is often operatively connected to selected circuits and/or electrical loads while such tests are conducted. However, to protect the battery from undesirable drainage or loss of charge after manufacture (e.g., during shipping and/or storage), it has commonly been the practice after completing the aforementioned testing to disconnect selected circuits or loads from the battery by manually removing or physically disconnecting a corresponding fuse typically arranged between the battery and the load or circuit that is to be isolated. While generally effective, this approach can be time consuming and labor intensive with respect to the manufacturing process. Furthermore, physically removing the fuse from its proper location generally increases the risk that the fuse may become lost or misplaced.

Additionally, the aforementioned approach generally requires replacement of the fuse before delivery of the vehicle to a customer. To maximize battery protection, it is typically preferred that the fuse be replaced just before the customer takes delivery of the vehicle. In this manner, the battery remains isolated from the otherwise current drawing load, e.g., while the vehicle sits in inventory on a dealer's lot. The dealer is therefore commonly responsible for replacing the fuse at the appropriate time. Nevertheless, dealer compliance can be difficult to ensure. For example, a dealer may replace the fuse at or near the time they receive the vehicle, thereby causing the battery charge to drain or diminish while the vehicle remains on their lot. Alternately, a dealer may forget to replace the fuse before the vehicle is delivered to a customer. In either case, customer dissatisfaction can result.

Accordingly, a new and improved method and/or system is disclosed that overcomes the above-referenced problems and others by automatically isolating one or more electrical current drawing loads from a vehicle battery after completing desired testing in connection with the manufacturing processes.

SUMMARY

According to one aspect, a battery protection system is provided in a vehicle having an ignition system for selectively starting and stopping an engine of the vehicle and an electrical system including an electrical load and a battery that selectively delivers electric current to said load via a first device that protects said load from receiving excessive current. The battery protection system includes: a second device that selectively connects and disconnects the load from the battery; and a controller that controls said second device in response to a detected number of ignition cycles.

According to another aspect, a method of protecting a battery is provided in a vehicle having an ignition system for selectively starting and stopping an engine of the vehicle and an electrical system including an electrical load and a battery that selectively delivers electric current to said load via a first device that protects said load from receiving excessive current. The method includes: detecting ignition cycles of the engine; counting the number of detected ignition cycles; and selectively disconnecting the load from the battery in response to the counted number of ignition cycles.

According to still another aspect, a battery protection system is provided in a vehicle having an ignition system for selectively starting and stopping an engine of the vehicle and an electrical system including an electrical load and a battery that selectively delivers electric current to said load. The battery protection system includes: means for detecting ignition cycles of the engine; means for counting the number of detected ignition cycles; and means for selectively disconnecting the load from the battery in response to the counted number of ignition cycles.

DETAILED DESCRIPTION

Generally, the present specification describes a system and/or method that overcomes the above-mentioned drawbacks by providing a device (e.g., a relay or other like switch) along with a suitable controller to automatically cut-off power from a vehicle battery to one or more selected circuits or loads upon detecting that one or more triggering conditions have been met or satisfied. For example, the triggering condition is suitably a set or otherwise determined number of ignition cycles. That is to say, the controller suitably monitors ignition cycles, and after a predetermined number of ignition cycles have been detected, the controller automatically trips or otherwise controls the relay to cut the power from the battery to one or more selected circuits or loads without having to remove the corresponding fuse. Suitably, the number of ignition cycles at which the controller trips the relay is selected or set to substantially match the number of ignition cycles that are executed or scheduled to be executed in connection with testing procedures implemented at or about the time of manufacturing. Accordingly, without having to manually or physically remove or disconnect the fuse, at the end of the testing—presuming the scheduled ignition cycles have in fact been executed—the battery is automatically isolated from the otherwise current drawing loads insomuch as the controller will have tripped the relay cutting power from the battery to the selected loads or circuits.

To operatively reconnect the battery to the selected loads and/or circuits after the relay has been initially tripped following the manufacture associated testing of the vehicle, the relay is simply reset at the time desired. Suitably, a designated control sequence (e.g., depressing a particular combination of buttons on the vehicle's instrument panel and/or otherwise manipulating selected operator controls in a particular order and/or combination) prompts the relay controller to reset the relay. Alternately, a diagnostic tool or other device that interfaces with the vehicle's main computer or control system allows a technician or other suitable individual to signal the relay controller to reset the relay. Suitably, the same routine or a similar technique is optionally employed to disable the controller from repeatedly tripping the relay each time the particular number of ignition cycles are executed. In this manner, the particular load or loads do not continue to be periodically isolated from the vehicle battery during the intended normal operation of the vehicle, e.g., by the customer.

Figure 1:
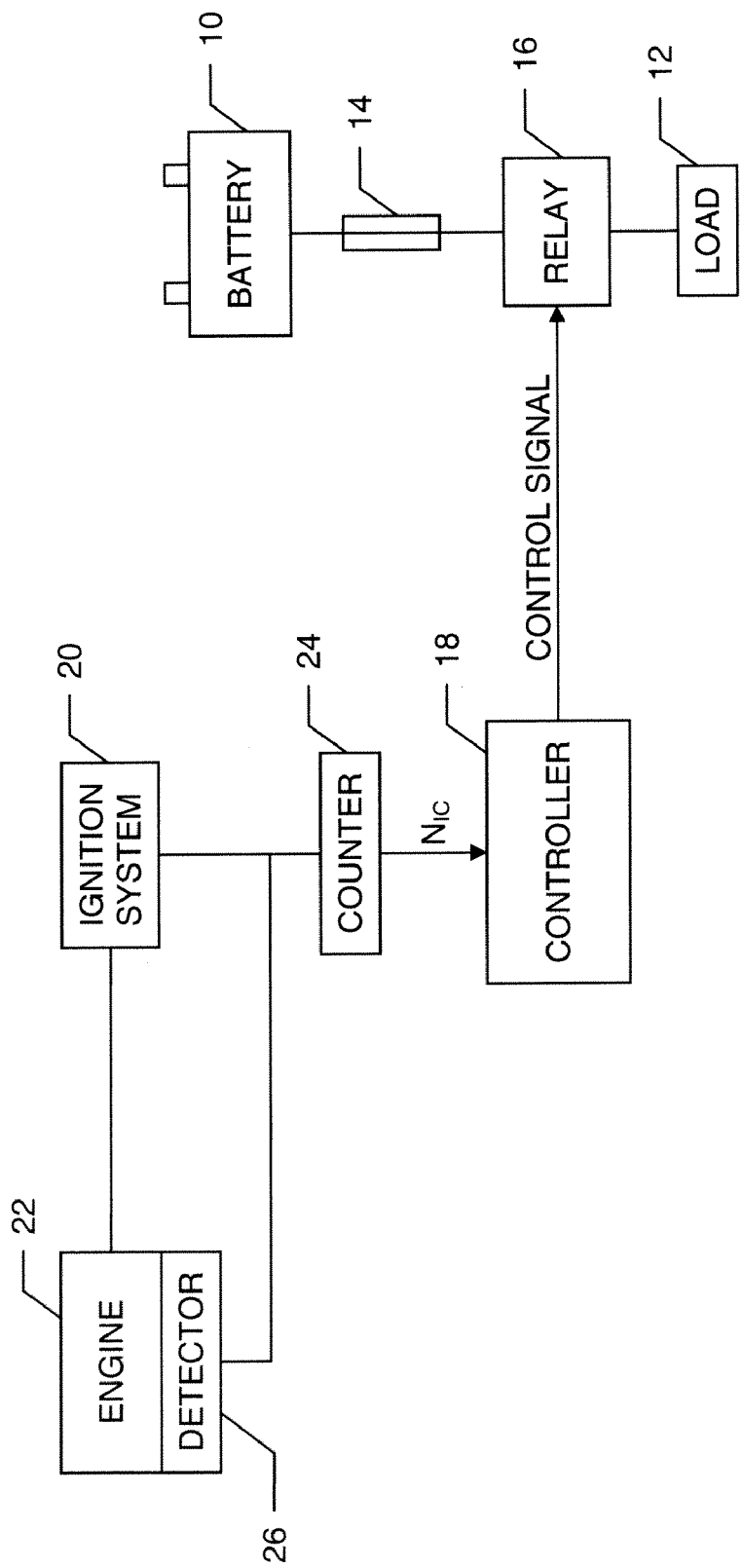
FIG. 1 is a schematic diagram showing an exemplary electrical system of a vehicle suitable for practicing aspects of the present disclosed subject matter.

Referring now to the drawings, wherein the showings are for purposes of illustrating one or more exemplary embodiments, FIG. 1 shows a schematic diagram of a vehicle's electrical system including a storage battery 10 that selectively supplies electric power and/or current to an electrical circuit or load 12. Also shown in FIG. 1 is a fuse 14 or other similar device through which the electric power and/or current is delivered to the load 12 from the battery 10. Suitably, the fuse 14 protects the load 12 from receiving excessive electrical power or current.

As shown in FIG. 1, a device such as a relay 16 or other suitable switch or the like is also arranged between the battery 10 and load 12, e.g., in series with the fuse 14. Under the control of a controller 18, the relay 16 is selectively opened and closed. In its open state, the relay 16 disconnects or otherwise isolates the load 12 from the battery 10 so that current or electric power is not drawn by the load 12 from the battery 10. That is to say, in practice, when the controller 18 detects a selected condition or otherwise determines that certain criteria are met, the controller 18 sends a suitable control signal to the relay 16. In response to the control signal, the relay 16 is tripped or otherwise set to its open state thereby cutting-off the delivery of electric power or current from the battery 10 to the load 12. Alternately, in its closed state, the relay 16 operatively connects the load 12 to the battery 10 so that electric power and/or current can be delivered from the battery 10 to the load 12. Notably, in accordance with the illustrated embodiment, isolation of the load 12 from the battery 10 can be automatically achieved via the relay 16 without physical removal or manual disconnection of the fuse 14.

Suitably, the controller 18 regulates or otherwise controls operation of the relay 16 in response to one or more triggering conditions having been detected and/or selected criteria having been met. For example, in the illustrated embodiment, the controller 18 trips or otherwise switches the relay 16 from its closed state to its open state upon the detection of a set or otherwise determined number of ignition cycles being detected. As shown in FIG. 1, the vehicle includes an ignition system 20 for selectively starting and stopping an engine 22 of the vehicle. In the illustrated embodiment, the ignition system 20 is suitably monitored and/or an appropriate signal is otherwise provided therefrom to a counter 24 or the like which in turn records or otherwise counts the number of ignition cycles (i.e., engine starts and stops) that are executed by the ignition system 20. Alternately, a detector 26 (e.g., a vibration or sound sensor or other suitable sensor) may be arranged with respect to the engine 22 to provide the counter 24 with an indication of the engine starts and stops.

In either case, the controller 18 is suitably provisioned with a set or otherwise determined threshold value and also receives or otherwise obtains the number of ignition cycles registered or recorded by the counter 24. Accordingly, the controller 18 compares the number of ignition cycles supplied by the counter 24 to the threshold. If the number of ignition cycles meets or is equal to the threshold, then the controller 18 trips or otherwise sets the relay 16 to its open state. Otherwise, if the number of ignition cycles is below or less than the threshold, then the controller 18 does not trip or otherwise maintains the relay 16 in its closed state. Suitably, the threshold is selected or set to substantially match the number of ignition cycles that are normally executed or scheduled to be executed in connection with testing procedures implemented at or about the time of manufacturing. Accordingly, at the end of the testing—presuming the scheduled ignition cycles have in fact been executed—the load 12 is automatically isolated from the battery 10 without having to physically remove or manually disconnect the fuse 14.

Figure 2:
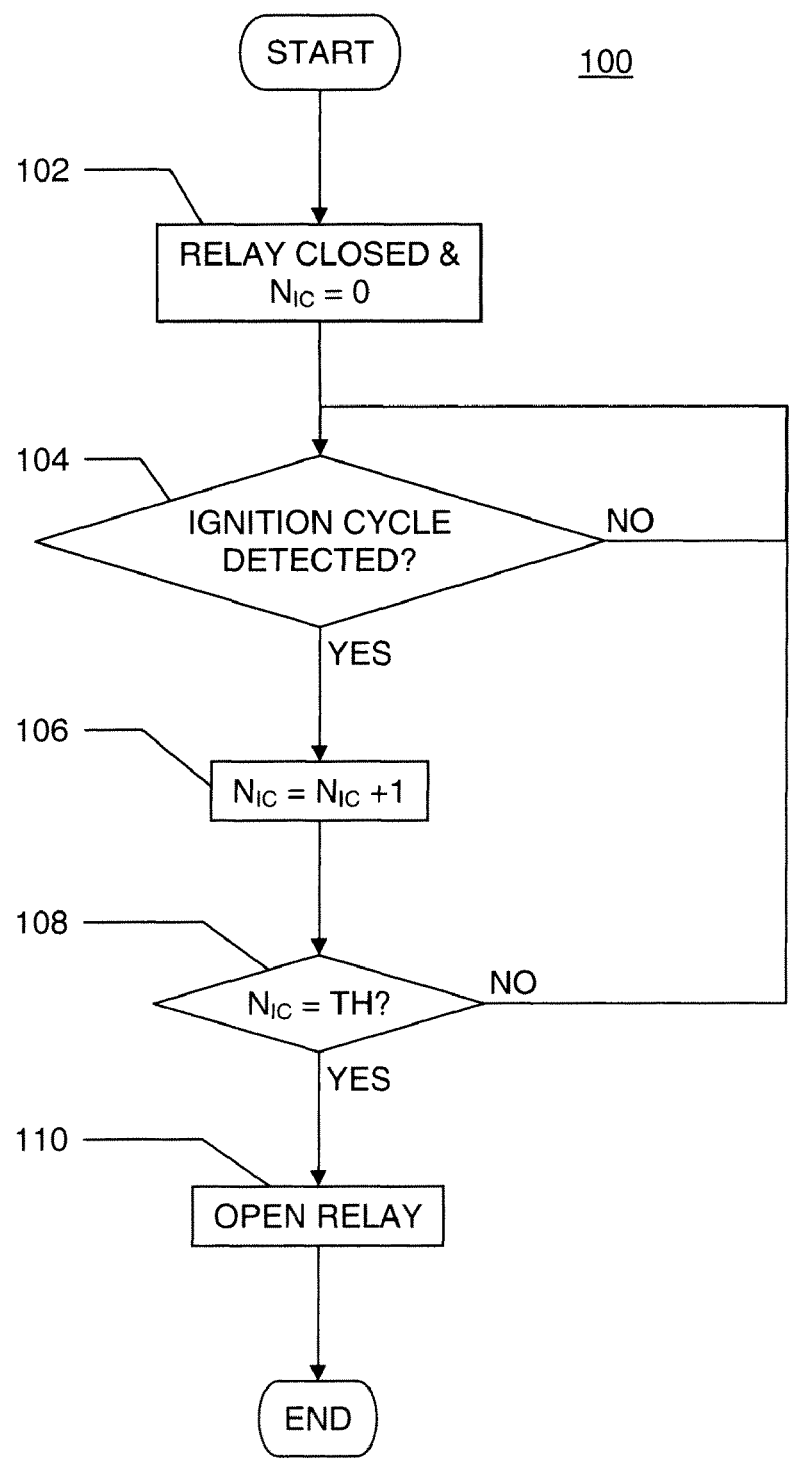
FIG. 2 is a flow chart showing an exemplary process for automatically isolating an electrical load from a vehicle battery in accordance with aspects of the present disclosed subject matter.

With reference to FIG. 2, an exemplary process 100 is illustrated for automatically disconnecting or isolating the load 12 from the battery 10 following the completion of the vehicle's manufacture associated testing. Please note that herein the following notation is used to represent the corresponding parameters: $N_{IC}$ represents the number of ignition cycles recorded or counter by the counter 24, and TH represents the threshold value provisioned for the controller 18.

Suitably, as indicated in box 102, at the beginning of the process 100, the relay 16 is initially in its closed state and the counter 24 is set to zero (i.e., $N_{IC}=0$). If for some reason, the relay 16 is not already in its closed state and/or the counter 24 does not register zero ignition cycles, then the relay 16 may optionally be set to its closed state and/or the counter 24 initialized to zero via the process described below with respect to FIG. 3. In either case, these initial conditions are suitably set or otherwise realized prior to the initiation of testing. The remainder of the process 100 is thereafter executed during the test phase of manufacture which generally includes a scheduled number of ignition cycles.

At decision step 104, it is determined if an ignition cycle has been detected. For example, this may be achieved via suitable monitoring of the ignition system 20 or via the detector 26. If no ignition cycle is detected, then the process 100 loops back to again execute step 104. In this manner, step 104 is repeated until an ignition cycle is detected. Alternately, if an ignition cycle is detected, then the process 100 continues to step 106 where the counter 24 is incremented or advanced in response to the detected ignition cycle (i.e., $N_{IC}=N_{IC}+1$). In this manner, the counter 24 records or otherwise maintains a running total of the number of detected ignition cycles.

The number of detected ignition cycles ($N_{IC}$) is in turn provided by the counter 24 to the controller 18, and at decision step 108, the controller 18 compares the number of ignition cycles obtained from the counter 24 to the provisioned threshold. Suitably, the threshold is selected or set to reflect the number of ignition cycles that are scheduled or designated for the particular test phase in question. If the number of ignition cycles obtained from the counter 24 has not yet reached the threshold (i.e., $N_{IC}<TH$), then the process 100 loops back to step 104 to continue detection of ignition cycles. Otherwise, if the number of ignition cycles obtained from the counter 24 has reached the threshold (i.e., $N_{IC}=TH$), then the process 100 continues to step 110 where the controller 18 trips or otherwise switches the relay 16 from its closed state to its open state thereby disconnecting or isolating the load 12 from the battery 10.

As can be appreciated, presuming the scheduled or designated number of ignition cycles are in fact executed during the testing phase in question, then in accordance with the illustrated process 100, the load 12 is disconnected or isolated from the battery 10 automatically upon completion of the testing, i.e., without resorting to manual removal or physical disconnection of the fuse 14. Accordingly, the vehicle is ready to be shipped and/or stored without concern that during this generally idle time period the charge in the battery 10 will undesirably be depleted due to current draw from the load 12.

In another suitable embodiment, the relay 16 may also optionally be manually tripped or set to its open state, e.g., in case the scheduled number of ignition cycles are not executed during the manufacture associated testing or for other reasons. That is to say, a technician or other individual may selectively operate the controller 18 and/or relay 16 in a deliberate fashion so as to switch the relay 16 to its open state thereby disconnecting or otherwise isolating the load 12 from the battery 10. For example, a suitable "trip relay" signal or instruction is optionally generated in response to a manual operation or user input provided by a technician or other individual, e.g., such as entering a designated control sequence via the operator controls. That is to say, depressing a particular combination of buttons on the vehicle's instrument panel, steering wheel or console and/or otherwise manipulating selected operator controls in a particular order and/or combination optionally results in the trip relay signal or instruction being generated and sent to the controller 18. Alternately, a diagnostic tool or the like which selectively interfaces with the vehicle's central processing unit or computer control system can be used by a technician or other like individual to generate and/or send the trip relay signal or instruction to the controller 18. Suitably, upon receiving the trip relay signal or instruction, the controller 18 complies accordingly. Alternately, the trip relay signal or instruction may be provided directed to the relay 16 which behaves accordingly. In either event, suitably, this manual operation and/or control of the relay 16 allows for added flexibility during manufacture and thereafter. For example, to better appreciate the benefit of such a feature, let us assume that after manufacture of the vehicle, testing indicates that repairs should be made. During the repairs and/or retesting, it may be the case that the load 12 is operatively reconnected to the battery 10 (e.g., via the process described below with reference to FIG. 3). Accordingly, it may be beneficial to have a direct manner in which to selectively trip the relay 16 without having to execute the prescribed number of ignition cycles. In this manner, the vehicle may again be made ready for shipping and/or storage without concern that during this generally idle time period the charge in the battery 10 will undesirably be depleted due to current draw from the load 12.

Of course, however, it is generally desirable to operatively reconnect the load 12 to the battery 10 once the vehicle is ready for normal use, e.g., just prior to delivery to a customer. Moreover, it is generally undesirable during the intended normal operation or use of the vehicle, e.g., by the customer, to have the load 12 repeatedly disconnected or isolated from the battery 10 each time the designated number of ignition cycles is detected. Accordingly, the exemplary process 200 illustrated in FIG. 3 is optionally executed to prepare the vehicle for normal operation, e.g., the process 200 may optionally be executed at or about the time the vehicle is delivered to the customer.

Figure 3:
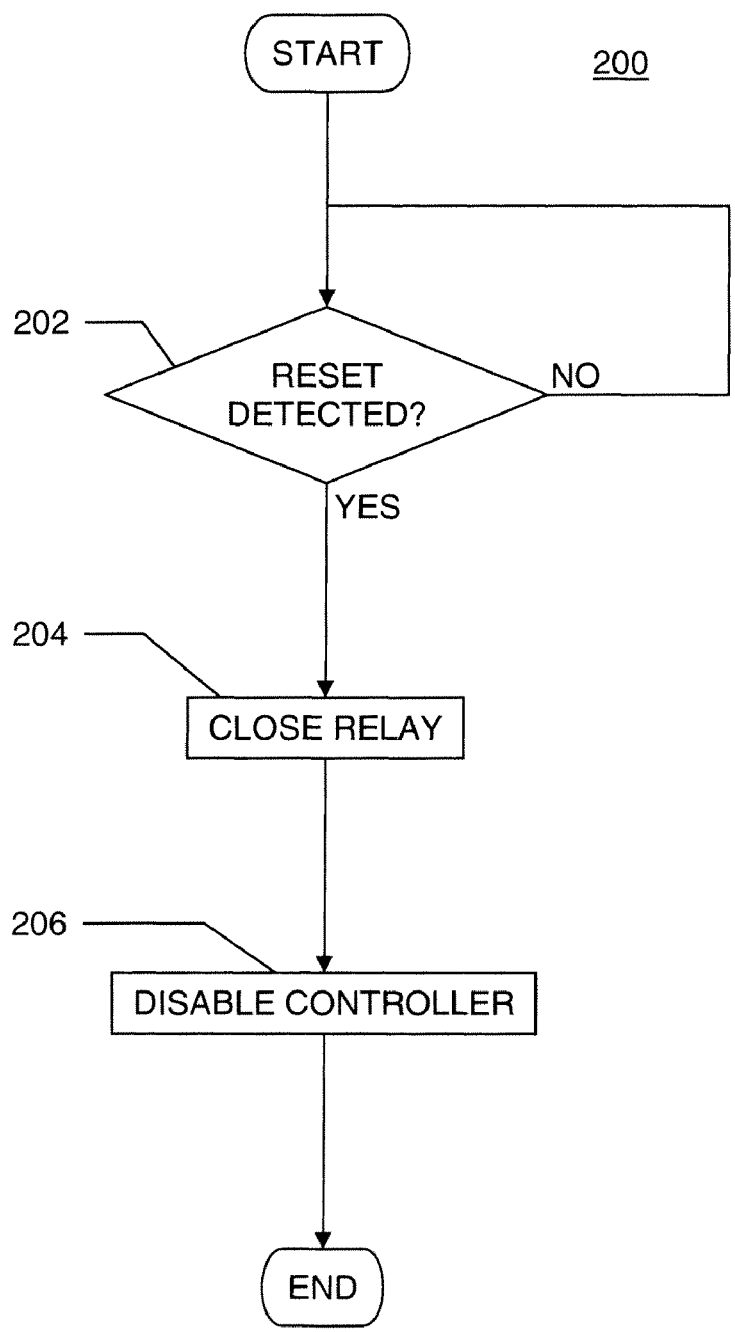
FIG. 3 is a flow chart showing an exemplary process for selectively reconnecting an electrical load to a vehicle battery and/or disabling the automatic load isolating function.

As illustrated in FIG. 3, the process 200 begins with decision step 202 where it is determined if the controller 18 detects or otherwise receives a reset signal. Suitably, the reset signal is generated in response to a vehicle operator entering a designated control sequence via the operator controls. That is to say, depressing a particular combination of buttons on the vehicle's instrument panel, steering wheel or console and/or otherwise manipulating selected operator controls in a particular order and/or combination optionally results in the reset signal being generated and sent to the controller 18. Alternately, a diagnostic tool or the like which selectively interfaces with the vehicle's central processing unit or computer control system can be used by a technician or other like individual to generate and/or send the reset signal to the controller 18. In either case, if the controller 18 does not detect or receive the reset signal, then the process 200 loops back to repeat step 202. In this manner, step 202 is repeated until the reset signal is received or detected by the controller 18. Otherwise, if the controller 18 does detect or receive the reset signal, then the process 200 continues to step 204.

At step 204, in response to the receipt and/or detection of the reset signal, the controller 18 resets the relay 16 to its closed stated, thereby operatively reconnecting the load 12 to the battery 10 so that electric power and/or current can again be received by the load 12 from the battery 10. Optionally, at step 206, the controller 18 is also disabled so that a subsequent number of ignition cycles does not again result in the load 10 being disconnected and/or isolated from the battery 10. That is to say, having disabled the controller 18, the relay 16 will remain in its closed state even if the threshold number of ignition cycles are again experienced during the intended normal operation and/or use of the vehicle.

In another suitable embodiment, resetting the relay 16 and/or disabling the controller 18 is also achieved by again monitoring ignition cycles. More specifically, if the detected number of ignition cycles meets or exceeds a second determined threshold ($TH_{reset}$) (i.e., that is over and above the first threshold TH), then the relay 16 is optionally reset (i.e., switch to its closed state) and the controller 18 is optionally disabled. Suitably, $TH_{reset}$ is sufficiently greater than TH so as to guard against inadvertent resetting of the relay 16 and/or disabling the controller 18, e.g., in connection with the manufacture associated testing. To better understand the benefit of this feature, let us assume that the controller 18 has automatically or otherwise tripped the relay 16 (i.e., set the relay to its open state so as to operatively disconnect the load 12 from the battery 10), e.g., due to the number of ignition cycles having first reached the threshold TH during the manufacture associated testing. A some later time, e.g., upon delivery of the vehicle to a customer, let us assume that perhaps the dealer has forgotten to reset the relay 16 and/or disable the controller 18. Nevertheless, if there is detected an additional number of ignition cycles being executed over and above the threshold TH, e.g., so as to reach the second threshold $TH_{reset}$, then the relay 16 is optionally reset (i.e., switched from the open state to the closed state) and the controller 18 is optionally disabled. Accordingly, the load 12 is automatically reconnected to the battery 10 and the controller 18 disabled as desired for the intended normal operation or use of the vehicle by the customer or other operator.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in common elements and/or components where appropriate. For example, the counter 24 may suitably be integrated in the controller 18. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. For example, the controller 18 and/or counter 24 may be implemented as appropriate hardware circuits or alternately as microprocessor programmed to implement their respective functions. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, it will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. In a vehicle having an ignition system for selectively starting and stopping an engine of the vehicle and an electrical system including an electrical load and a battery, a battery protection system connected to the vehicle ignition system comprising:
    a first device connected between the battery and the load to protect the load from receiving excessive current;
    a second device connected in series with the first device, the second device having a closed state and an open state to selectively connect and disconnect respectively the load to and from the battery; and
    a counter connected to the ignition system to count a number of ignition cycles; and
    a controller connected to said second device to thereby control the operation of the second device in response to the number of ignition cycles from the controller, the controller having a first threshold number store therein,
    wherein the controller obtains the number of ignition cycles from the counter and compares the number of ignition cycles to the first threshold number, and
    wherein the controller controls the second device to operate in the closed state to connect the battery to the load until the number of ignition cycles is greater than the first threshold number.

2. The battery protection system of claim 1, wherein the controller controls the second device to operate in the open state when the number of ignition cycles is greater than the first threshold number thereby disconnecting the battery from the load.

3. The battery protection system of claim 2, wherein after the controller detects that the number of ignition cycles is greater than the first threshold number the controller is disabled to thereby prevent inadvertent disconnection of the load from the battery when the second device is reset to a closed state.

4. The battery protection system of claim 3, wherein the controller has a second threshold number stored therein, whereby the second threshold number is substantially greater than the first threshold number, and
    wherein the second device is reset to the closed state and the controller is disabled when the number of ignition cycles is greater than the second threshold number.

5. The battery protection system of claim 3, wherein the second device is reset to the closed state and the controller is disabled when a vehicle operator operates specific vehicle controls located in a vehicle passenger compartment.

6. The battery protection system of claim 1, wherein the first device is a fuse and the second device is a relay or a switch.

7. A battery protection system connected to a vehicle ignition system comprising:
    a first device connected between a battery and a load to protect the load from receiving excessive current;
    a second device connected in series with the first device and having a closed state and an open state to selectively connect and disconnect respectively the battery to and from the load;
    a counter connected to the ignition system to count a number of ignition cycles; and
    a controller connected to the second device to thereby control the operation of the second device in response to the number of ignition cycles from the counter, the controller having a first threshold number stored therein,
    wherein the controller obtains the number of ignition cycles from the counter and compares the number of ignition cycles to the first threshold number,
    wherein if the number of ignition cycles is less than the first threshold number the controller controls the second device to operate in the closed state,
    wherein if the number of ignition cycles is greater than the first threshold number the controller controls the second device to operate in the open state thereby disconnecting the battery from the load, and
    wherein after the controller detects that the number of ignition cycles is greater than the first threshold number the controller is disabled to thereby prevent inadvertent disconnection of the load from the battery when the second device is reset to a closed state.

8. The battery protection system of claim 7, wherein the controller has a second threshold number stored therein, whereby the second threshold number is substantially greater than the first threshold number, and
    wherein the second device is reset to the closed state and the controller is disabled when the number of ignition cycles is greater than the second threshold number.

9. The battery protection system of claim 7, wherein the second device is reset to the closed state and the controller is disabled when a vehicle operator operates specific vehicle controls.

10. The battery protection system of claim 7, wherein the first device is a fuse and the second device is a relay or a switch.

11. A method of protecting a battery connected to a vehicle ignition system comprising:
    providing a first device connected between a battery and a load, a second device connected in series with the first device and having a closed state and an open state, and a controller connected to the second device to thereby control the operation of the second device, the controller having a first threshold number stored therein;
    counting a number of ignition cycles;
    comparing the number of ignition cycles to the first threshold number;
    closing the second device if the number of ignition cycles is less than the first threshold number; and
    connecting the battery to the load until the number of ignition cycles is greater than the first threshold number.

12. The method of claim 11 further comprising:
opening the second device when the number of ignition cycles is greater than the first threshold number; and
disconnecting the battery from the load.

13. The method of claim 12, wherein after the controller detects that the number of ignition cycles is greater than the first threshold number, the method further comprising:
resetting the second device to a closed state; and
disabling the controller to prevent inadvertent disconnection of the battery from the load.

14. The method of claim 13, wherein the controller has a second threshold number stored therein, whereby the second threshold number is substantially greater than the first threshold number, and wherein when the number of ignition cycles is greater than the second threshold number the method further comprising:
resetting the second device to a closed state; and
disabling the controller to prevent inadvertent disconnection of the battery from the load.

15. The method of claim 13, wherein when a vehicle operator operates specific vehicle controls the method further comprising:
resetting the second device to the closed state; and
disabling the controller to prevent inadvertent disconnection of the battery from the load.

* * * * *